Sept. 26, 1961   J. LA TOUR, JR   3,002,065
ELECTRICAL DEVICE EMPLOYING STRESSED COLUMN
Filed March 16, 1959   3 Sheets-Sheet 1

INVENTOR
John LaTour, Jr.

BY Diggins & LeBlanc
ATTORNEYS

Sept. 26, 1961        J. LA TOUR, JR        3,002,065
ELECTRICAL DEVICE EMPLOYING STRESSED COLUMN
Filed March 16, 1959                    3 Sheets-Sheet 2

INVENTOR
*John LaTour, Jr.*

BY
*Diggins & LeBlanc*
ATTORNEYS

Sept. 26, 1961 J. LA TOUR, JR 3,002,065
ELECTRICAL DEVICE EMPLOYING STRESSED COLUMN
Filed March 16, 1959 3 Sheets-Sheet 3

INVENTOR
John La Tour, Jr.

BY
Diggins & Le Blanc
ATTORNEYS

United States Patent Office 3,002,065
Patented Sept. 26, 1961

3,002,065
ELECTRICAL DEVICE EMPLOYING
STRESSED COLUMN
John La Tour, Jr., 124 Emmett St., Daytona Beach, Fla.
Filed Mar. 16, 1959, Ser. No. 799,776
1 Claim. (Cl. 200—87)

This invention relates to electrical circuit devices employing stressed columns and more particularly is directed to an electrical circuit maker or breaker in which a compressed column acts as a movable element or armature operating to open or close an electrical circuit.

While the present invention provides a device having general utility as a circuit making and breaking device for use in switches, relays, vibrators, field strength meters, accelerometers and the like, a specific embodiment of the present invention will be described in conjunction with its use as a circuit maker for protecting highly sensitive current measuring instruments from overload.

Although a wide variety of devices have heretofore been employed for protecting ammeters from overload, they have almost uniformly failed to exhibit at least one or several of the basic requirements essential for truly satisfactory operation. A device of the type under consideration suitable for use in protecting an ammeter in response to an over-load condition should be (a) non-energy consuming; (b) mechanically stable; (c) electrically reliable; (d) should not affect the sensitivity of the meter; (e) should not affect the accuracy of the meter; (f) should not add to the low impedance of the meter; (g) should in no way involve the meter movement; and (h) should operate rapidly enough to protect the meter.

The well known temperature sensitive devices which employ either fuse links or a temperature responsive bimetallic strip have the serious disadvantages that they exhibit a substantial time lag between the initiation of the over-load condition and the actuation of the protective device, or insert a relatively large impedance into the circuit. Most available commercial circuit breakers at best require in the neighborhood of 6 to 8 cycles at a base frequency of 60 cycles per second to operate. Hence, these devices exhibit a time lag in the order of 100 milliseconds between the occurrence of the overload condition and the actual operation of the device.

The present invention, in the specific embodiment disclosed, provides a novel circuit making device capable of closing a protective circuit in a few milliseconds. The device employs a current carrying column loaded under compression past the point of buckling to sense the magnitude of an electromagnetic force. The device exhibits all the basic requirements for truly satisfactory operation listed above and is highly sensitive to extremely small changes in electromagnetic force.

It is therefore a primary object of the present invention to provide a novel electrical device employing a stressed column for sensing electromagnetic energy.

Another object of the present invention is to provide a novel high speed circuit making or breaking device.

Still another object of the present invention is to provide a novel circuit making or breaking device sensitive to relatively small changes in electromagnetic energy.

A still further object of the present invention is to provide an improved circuit making or breaking device having low impedance, with improved stability and reliability.

A still further object of the present invention is to provide a novel electromagnetic force sensing element in the form of a stably supported column stressed beyond its buckling point.

These and further objects and advantages of the invention will be more apparent upon reference to the following specification, claim and appended drawings wherein:

Figure 5:
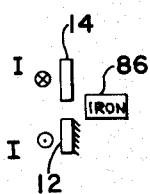
Figure 6:
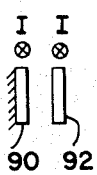
Figure 7:
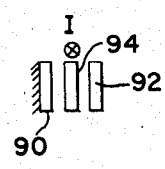
Figure 2:
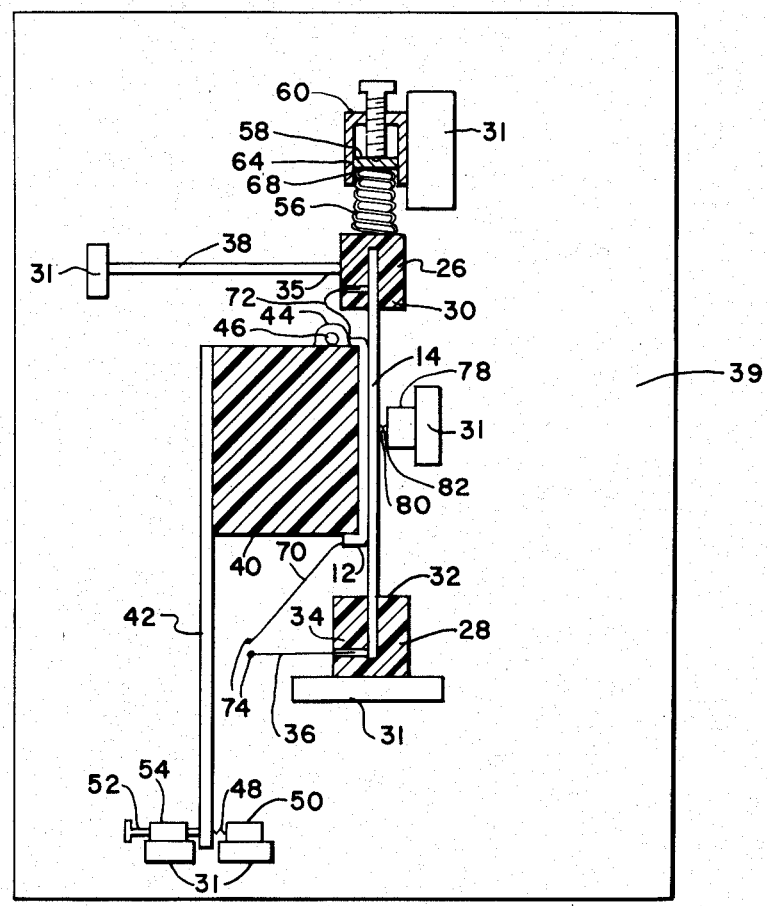
FIGURE 2 is a schematic diagram of the force sensing element of the present invention constructed to form a high speed, high sensitivity circuit maker.
Figure 8:
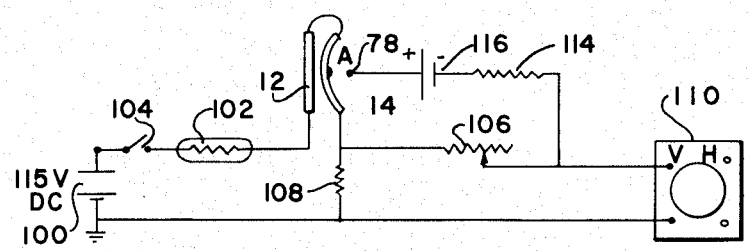
Figure 9:
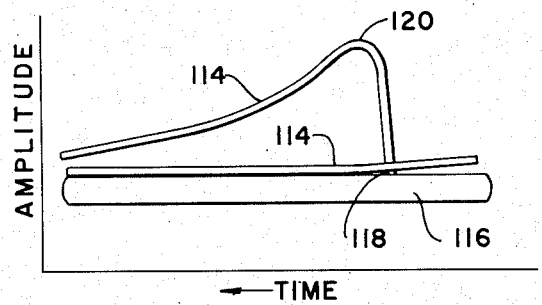
Figure 10:
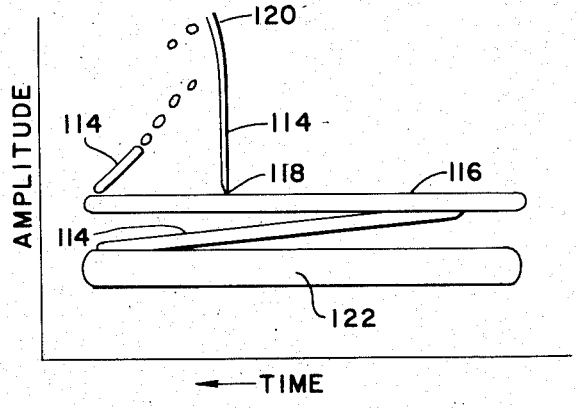
Figure 11:
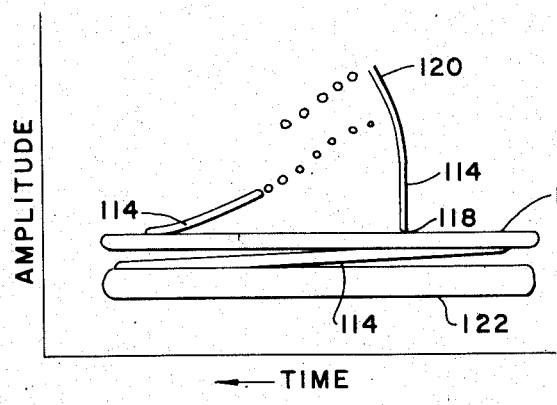

FIGURES 5 through 7 schematically show various modified embodiments of the novel compressed column device of the present invention;

FIGURE 8 is a circuit diagram of a circuit used in measuring the speed of operation of the circuit closing device of FIGURE 2;

FIGURE 9 is a representation of the display seen on the oscilloscope of the circuit of FIGURE 8 showing a purposely introduced overload transient superimposed upon a 60 cycle horizontal sweep signal;

FIGURE 10 is a representation similar to that of FIGURE 9 showing the closing time of the circuit maker of FIGURE 2; and FIGURE 11 is a representation similar to that shown in FIGURE 10 for a slight increase in initial spacing between the closable contacts.

Refering to the drawings, the novel sensing element of the present invention generally indicated at 10, includes a stationary electrically conducting plate or column 12 and a movable electrically conducting plate or column 14. Columns 12 and 14 are connected in series for current flow by means of flexible leads 16, 18 and 20, the direction of current flow being indicated by the direction of the arrows in the drawing. As shown, a compressive force indicated by the arrows labeled F is applied to the ends of the movable column 14 so as to stress this column beyond its buckling point. Column 14 is initially prevented from buckling by stationary column 12 which provides a rigid support against which movable column 14 may lean to restrain it from buckling. Columns 12 and 14 are electrically insulated from one another by a layer 22 of suitable insulating material applied to the inner surface of column 12.

As is well known, oppositely directed currents flowing through adjacent parallel conductors generate magnetic fields which combine to produce a resulting force tending to further separate the adjacent conductors. Hence, any current flowing through conductors 12 and 14 tends to push the center portion of conductor 14 in a perpendicular direction away from conductor 12. If the force generated by the flowing current is of sufficient magnitude, it will force the center portion of column 14 through the center line joining the forces F indicated in the drawing, causing the column 14 to buckle outwardly from stationary plate or column 12.

Figure 1:
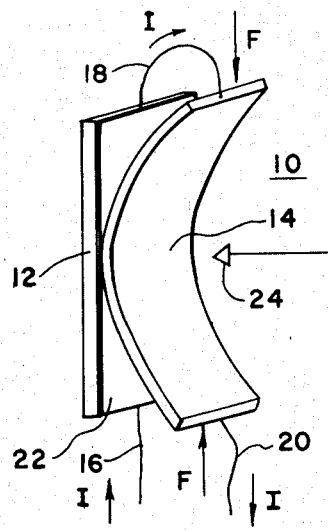
FIGURE 1 is a perspective view showing the basic components of the novel force sensing element of the present invention.

The device of FIGURE 1 includes a stationary contact 24 upon which movable column 14 impinges in its movement outwardly from stationary column 12. Contact 24 is prefarbly so constructed and positioned to intercept the movement of column 14 before column 14 reaches a position at which it will completely rupture. The mating of column 14 with contact 24 may serve to close a suitable circuit about a high sensitivity ammeter so as to protect the ammeter from over load currents. In such a case, the meter shunting circuit has its respective terminals connected to contact 24 and to column 14. This latter connection if desired can be made by way of one of the leads 18 and 20.

Mechanical stability of the device is achieved by having the movable column supported in a slightly buckled configuration against stationary column 12 in a direction opposite from the direction of the electromagnetic force. The degree of mechanical stability depends upon a variety of mechanical adjustments and may be made very small. If relatively long column proportions are used, the magnitude of the compression force required to produce buckling of the movable column can be computed from the equation $$P = \frac{EI\pi^2}{L^2}$$

Where:
P is the buckling force
E is the modulus of elasticity
I is the minimum moment of inertia and
L is the length of the column Assuming by way of example that column 14 is made of aluminum, is two inches long and 1/75 of an inch thick, the force necessary to produce buckling of the column computed from the above equation is $P=1.74$ lbs.

FIGURE 2 is a more detailed partially schematic plan view of the circuit closing device of FIGURE 1 with parts in section, illustrating in detail the column supporting structure and spring structure for applying a compressive force to the ends of the movable column. A pair of end blocks 26 and 28 of Lucite or other suitable insulating material may be suitably apertured or slotted at 30 and 32 respectively to receive the ends of the movable column 14. The ends of column 14 may be cemented in position in the slots in blocks 26 and 28 or suitable fastening means such as screws (not shown) may be employed for detachably securing the ends of column 14 in the slots in end blocks 26 and 28.

Lower block 28 is rigidly secured to and supported by a suitable supporting fixture 31, simply indicated in the drawing by a solid rectangle. In the embodiment constructed in accordance with the present invention the entire structure as seen in FIGURE 2 is horizontally placed over a square of plyboard 39 forming a base for the device and supported at the points indicated in the drawing in FIGURE 2 by a plurality of suitable supporting brackets or fixtures extending upwardly from the surface of the plyboard base and all labelled 31 and shown in block form for simplicity. It will be understood that the various supports 31 may take any of a wide variety of forms, the particular configurations of which form no part of the present invention.

Lower end block 28 may include an aperture indicated at 34 providing access for electrical connection to the lower end of column 14 by means of lead 36, which may be soldered or otherwise suitably connected to the bottom end of the column. A similar aperture 35 is included in upper block 26 providing access for lead 72 which electrically connects the upper ends of the two columns.

Upper block 26 containing the upper end of column 14 is secured to and supported by a flexible arm 38. The arm 38 may be constructed of any suitable material and preferably consists of spring metal such as spring steel or the like which rigidly supports block 26 above base 39 but possesses sufficient resiliency in a horizontal direction to permit small movements of block 26 under the influence of the applied force without substantial resistance to the movement of the block.

Stationary column 12 is mounted on one edge of a thick Lucite plate 40 in turn mounted upon one end of a long rigid arm 42. Column 12 with its insulation coated surface facing column 14 may be cemented or otherwise secured along the broad edge of Lucite plate 40. This latter plate includes a bracket 44 at the upper edge thereof for supporting plate 40 on a pivot pin 46. The lower end of rigid arm 42 is engaged by a coil spring 48 extending from spring housing 50 which spring urges the lower end of arm 42 against a set screw 52 threadedly received in a screw housing 54. As can be seen screw 52 provides a fine adjustment for adjusting the position of stationary column 12 about pivot pin 46 and hence the initial deflection of movable column 14.

A compressive force is exerted on the ends of movable column 14 through end blocks 26 and 28 by means of a second coil spring 56 bearing upon the end block 26. Spring 56 is compressed by a plunger plate 58 which slides in a housing 60. Screw 62 is screwed into the end of housing 60 and forces plunger plate 58 through any suitable rotary connection. For example, screw 62 may terminate in a hemispherical projection 64 which fits a corresponding depression in plunger plate 58.

The device of FIGURE 2 as constructed is adapted to extend horizontally over mounting board or base 39. One end of movable column 14 is supported by flexible rod 38 while the other end secured in block 28 is rigidly held by a suitable bracket 31 fixed to the base. Stationary column 12 may be rigidly secured to support means by any well known bracket construction but as shown in FIGURE 2 is constructed to be adjustable with one end supported by pivot pin 46. Housing 60 may similarly be supported from the horizontal mounting board by a suitable fixture 31.

In operation the circuit making device of FIGURE 2 may be initially set by applying a suitable amount of compressive force to the movable column 14 through block 26 by means of spring 56 and screw 62. In its initial position movable column 14 leans on stationary column 12 in contact with the insulation over the adjacent surface of column 12. The initial direction of flexure or bend of column 14 may be obtained by slightly off-centering the compression force applied or may simply be obtained by a light touch of the hand to bring column 14 into contact with stationary column 12. While the application of the force from coil spring 56 is shown as substantially axial with respect to movable column 14 it will be apparent that this is not critical, the only requirement being that the applied force have some substantial component in the direction of the longitudinal axis of column 14.

Figure 3:
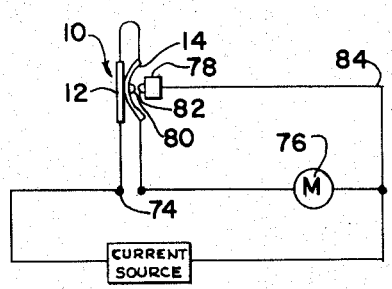
FIGURE 3 is a circuit diagram showing the circuit maker of FIGURE 2 connected in a meter overload protection circuit.

The connection by way of leads 70, 72 and 36 places columns 12 and 14 in series for electrical current flow. With terminals 74 connected to receive the current through a meter to be protected labeled 76 in FIGURE 3 any overload current flowing through the meter circuit, either in the form of a large steady state current or an undesirable transient current, will generate a magnetic force causing columns 12 and 14 to separate, with column 14 moving towards a stationary contact 78 positioned a short distance from column 14. Electrical contact may be made by means of suitable buttons 80 and 82 on column 14 and contact 78. As best seen in FIGURE 3, movement of column 14 closes a shunt circuit through lead 84 which serves to by-pass excess current about meter 76 thus protecting it from undesirable overload conditions.

Figure 4:
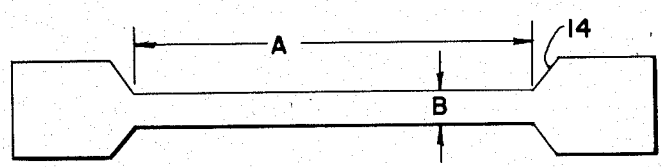
FIGURE 4 shows one form of a specific column used in conjunction with the present invention.

FIGURE 4 shows a typical movable column 14 employed in the structural arrangement of FIGURE 2, made of soft aluminum in rolled sheet form. The A dimension indicated in FIGURE 4 in the example shown is 4.8 inches, the B dimension is 0.147 inch and the column thickness is 0.032 inch. It is to be understood that the illustrated column 14 in FIGURE 4 with the above dimensions is given by way of example only and that the structural configuration and material used may be varied in accordance with the particular application of the device.

FIGURES 5 through 7 are diagrammatic representations of various modifications of the arrangement shown in FIGURE 1. Current flow through the respective columns 12 and 14 is indicated by the conventional circled cross and dot in the figures. In FIGURE 5 an iron bar or block 86 is placed adjacent to stationary column 12 and movable column 14. It is common knowledge that the flux path of the magnetic circuit in air may be generally broken into two sections; that portion within the loop and that portion without the loop. Each portion contributes about ½ of the reluctance. The presence of a small piece of iron in the outer portion does not greatly affect the reluctance, however, motion into the inner portion does greatly reduce the reluctance since the iron is as large as the inner volume. As a result there is a force tending to cause this arrangement, and accordingly, the column moves to the right.

FIGURE 6 shows a structural arrangement similar to FIGURE 1 with the stationary column 90 and movable column 92 constructed of silicon steel. As indicated in this figure, the two columns are connected in parallel so that the current flow through each column is in the same direction. In the embodiment of FIGURE 6, movable column 92 is supported by means not shown and moved toward stationary column 90 by the attractive forces generated by the parallel currents.

In FIGURE 7, an aluminum column 94 is interposed between stationary column 90 and movable column 92. As in FIGURE 6, the column 92 of FIGURE 7 is independently supported and caused to move in the direction of intermediate column 94 by the forces generated by the current flow through column 94 in the direction indicated.

FIGURE 8 shows a circuit arrangement for determining the speed of operation of the circuit making device shown in FIGURES 1 and 2. In this circuit a 115 volt D.C. supply illustrated by the battery 100 supplies a signal to the columns 12 and 14 through a tungsten lamp load 102 and switch 104, connected in series. Output voltage developed across adjustable resistor 106 and voltage drop resistor 108 is supplied to the vertical input terminal of a cathode ray oscilloscope 110. A calibrated internal 60 cycle sweep time is set on the horizontal trace of the oscilloscope. A second voltage dropping resistor 114 is connected in the output circuit of contact 78 through a 22.5 volt bias battery 116.

The closing of switch 104 causes current to flow through tungsten lamp load 102, which if desired may consist of a plurality of tungsten lamps connected in parallel, to the source 100. The initial current due to the low resistance of relatively cold tungsten is approximately 10 times the steady state value through the circuit after the tungsten is permitted to warm up to operating temperature. This initial in-rush of current provides a suitable transient for measuring the response time of column 14. When the transient trips column 14 and causes it to move, contact 78 closes changing the D.C. level on oscilloscope 110. The transient appears on the scope after closing of the switch in identical form as before but its D.C. level is shifted in a negative direction at the instant of contact due to the presence of bias battery 116 in the second circuit. By calibrating the sweep time of the horizontal trace and measuring the distance from the start of the transient to the point where the D.C. shift is introduced it is possible to determine the time of operation.

FIGURES 9 through 11 are representations of the presentation seen on the face of the oscilloscope 110 of FIGURE 8 with the vertical axis representing amplitude and the horizontal axis representing time plotted in the direction indicated by the arrows in the figures. Oscilloscope 110 is of the type employing direct coupled amplifiers thus responding to voltage drops resulting from direct currents and has a high persistence phosphor screen. The lower heavy trace 116 seen in FIGURE 9 represents the steady state zero bias voltage level of the potential drop across resistor 108 and adjustable resistor 106 over a number of sweep cycles. Since the sweep frequency is 60 cycles per second the length of one trace corresponding to one cycle represents .0167 second. Trace 114 represents the transient introduced by the tungsten lamp load 102 as viewed over two consecutive cycles of the 60 cycle sweep signal. As can be seen, the transient signal 114 is initiated at a position in time illustrated at 118, reaches a maximum at 120, and gradually dies out over two successive cycles.

FIGURE 10 shows, the operation of the complete circuit described with respect to FIGURE 8 with the circuit making device set for rapid operation so that the motion of column 14 is relatively short. Trace 116 again represents the no-bias signal trace of the voltage drop across resistor 108 and adjustable resistor 106 whereas the second heavy trace 122 represents the shifted D.C. level after the switch is closed and the negative bias source 116 of FIGURE 8 is connected in the circuit. Initiation of the transient 114 by closing switch 104 of FIGURE 8 is again indicated by reference numeral 118. Transient 114 similarly reaches a maximum indicated at 120. However, as can be seen in FIGURE 10, column 14 makes contact just prior to the time transient 114 reaches its maximum value so that the D.C. level is shifted downward from trace 116 to trace 122. Transient 114 is similarly shifted a corresponding distance downwardly and gradually diminishes to blend with trace 122. The gradual diminishing of transient 114 is indicated by the trace appearing between traces 116 and 120 constituting the next succeeding cycle of operation.

It will be noted however, that during the first cycle trace 114 is shifted, with initial contact as evidenced by a study of FIGURE 10 being accomplished in less than one millisecond. The appearance of two dotted curves for a portion of the transient is caused by the fact that the contact bounces before settling down.

FIGURE 11 is a representation similar to that of FIGURE 10 with the device set for relatively good stability and the contacts moved further apart so that the movement of column 14 is in the order of $\frac{1}{32}$ of an inch. The dotted portions of the transient trace again appear indicating the contact bounce. The time to the first contact remains relatively short, approximately in the order of two milliseconds or ⅛ of a cycle.

It will be noted that in both instances final contact was established in less than one cycle, representing a reduction in time of over 600% as compared with presently available commercial circuit making and breaking devices.

As can be seen the present invention provides a novel stressed column circuit element for performing a variety of rapid electrical functions. In the specific embodiments disclosed the device successfully protects ammeters over a substantial current range. Sensitivity to steady state values has been achieved down to about four amperes. This, in conjunction with the versatility, stability, and speed of operation indicates that the present invention including the basic concept of using a compressed column as the unstable element in an electrical device has a very broad range of application and a variety of uses. In operation the maximum complete closing time is in the order of 11 milliseconds and complete closing times as low as approximately one millisecond have been obtained.

The present invention provides a mechanically stable high speed circuit element having improved reliability and increased sensitivity. The column buckles in the second mode and the energy losses during operation are effectively limited to intermolecular friction in the column, springs, and supporting arm. Other methods of suspending the columns may be employed and pressure means other than springs may be used for loading the columns. All that is required is that the member be loaded to the point of elastic instability which may be accomplished by compressed air, weights, or any other desired means. Since the energy losses during operation are limited almost completely to intermolecular losses most of the energy available may be used for accelerating the moving part.

If desired the movable column can be permitted to completely fracture to open a circuit or may be constructed to behave as if it were one piece in passing through center but be able to hinge before being ruptured.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claims are therefore intended to be embraced therein.

What is claimed and desired to be secured by United States Letters Patent is:

An overload switch comprising a normally rigid elongated electrically conductive column; a pair of end block insulators for receiving the ends of said column; a first contact means carried by the center of said column; an adjustable coil spring connected to one of said end blocks for compressively stressing said first column along the longitudinal axis thereof to a point beyond its elastic stability; an elongated electrically conductive member pivotally mounted at one end and adjustably spring biased away from said column at the other end; said member positioned adjacent to said column and insulated therefrom; said member supporting said column in a flexed position; a current source; a device to be protected; first D.C. electrical means connecting in series relationship, said current source, member, column and device; second contact means spaced from said column on the side thereof opposite from said member and in alignment with said first contact means; second D.C. electrical means for coupling said column and said second contact means to provide a parallel path around said device, whereby overload current flow will be shunted around said device.

References Cited in the file of this patent

UNITED STATES PATENTS 2,915,607     Levine et al. _____ Dec. 1, 1959

FOREIGN PATENTS 896,561     France _____ May 2, 1944